April 7, 1925.                                                    1,532,169
F. H. BEST
METHOD OF AND MEANS FOR MEASURING TRANSMISSION
Filed Sept. 6, 1919
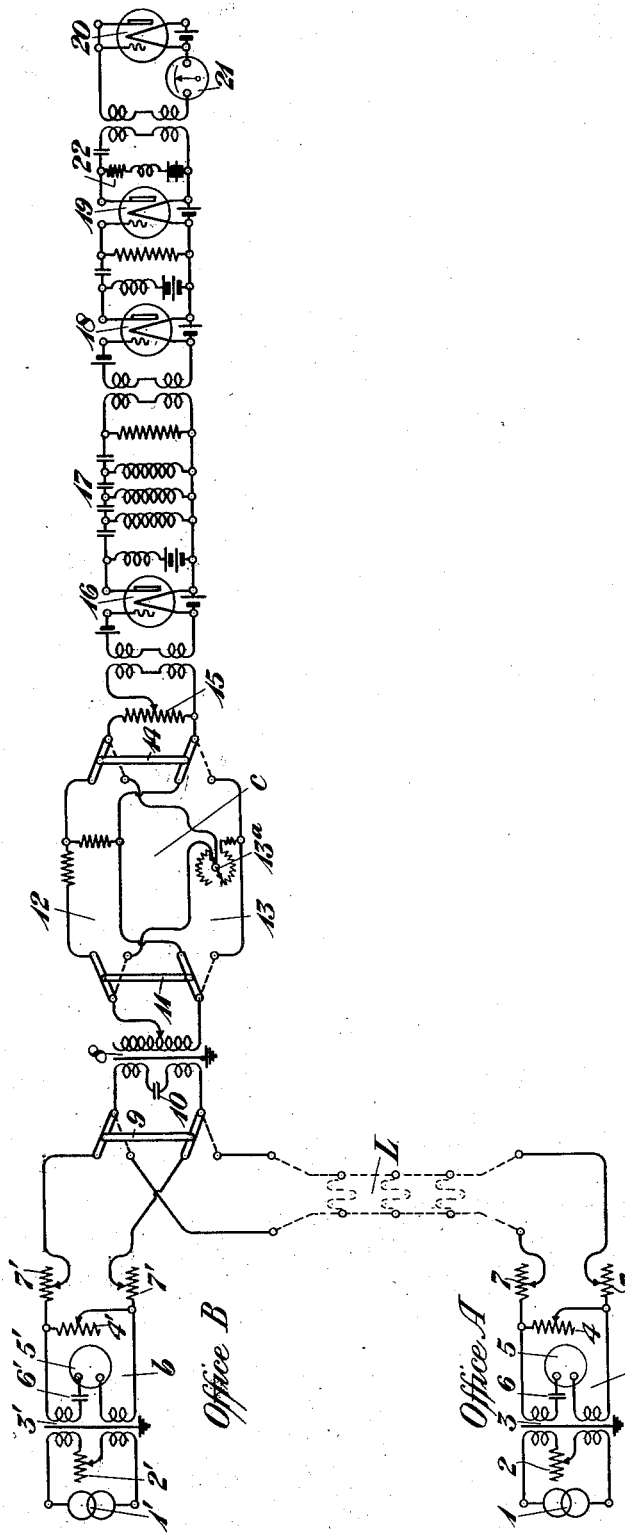
INVENTOR
F. H. Best
BY
ATTORNEY Patented Apr. 7, 1925.

1,532,169

UNITED STATES PATENT OFFICE.

FRED H. BEST, OF WESTFIELD, NEW JERSEY, ASSIGNOR TO AMERICAN TELEPHONE AND TELEGRAPH COMPANY, A CORPORATION OF NEW YORK.

METHOD OF AND MEANS FOR MEASURING TRANSMISSION.

Application filed September 6, 1919. Serial No. 322,085.

*To all whom it may concern:*

Be it known that I, FRED H. BEST, residing at Westfield, in the county of Union and State of New Jersey, have invented certain Improvements in Methods of and Means for Measuring Transmission, of which the following is a specification.

This invention relates to methods of and means for determining the transmission efficiency of electrical devices and circuits, such as telephone lines.

In telephone practice it is customary to express the transmission efficiency of an electrical device in terms of the number of miles of standard cable having like efficiency, this number being termed the "transmission equivalent" of the device. The transmission efficiency of the device under test is therefore given by the apparatus described below in terms of the transmission equivalent thereof, it being understood, however, that the apparatus may readily be modified to give the efficiency in other suitable terms.

The measuring circuit of this invention comprises a source of current, an artificial line and an ammeter for indicating the current flowing through the line. Means are provided whereby the device under test may be connected in series in a circuit with the artificial line between the source and the ammeter, so that a different, generally a smaller, value of current flows through the meter; that is, smaller than when the device under test is omitted from the said circuit. A dial is provided to vary the transmission equivalent of the artificial line until the current is restored to its prior value, this dial being graduated to indicate the extent of the change in the transmission equivalent of the artificial line, which change is equal to the equivalent of the device under test.

A good understanding of this invention may be had from the following description thereof, considered in connection with the accompanying drawing illustrating, in diagrammatic form, one arrangement of apparatus and circuits embodying the invention.

In this drawing, reference character L designates a transmission line extending from an office A to an office B, the transmission efficiency of which line is to be determined. The testing apparatus comprises a sending circuit *a* associated with the line at office A, which circuit consists of a generator 1, connected to the primary side of a shielded transformer 3, the secondary side of which is connected through an ammeter 5 to an artificial line comprised of resistances 4 and 7, a condenser 6 being connected in series with the meter to prevent the flow of direct current therethrough in case a source of direct current, in the line or other apparatus under test, is associated with the measuring equipment. A variable resistance 2 is connected in the primary circuit of transformer 3 for regulating the output current of the generator. The artificial line is provided for approximating the characteristic impedance of the line under test in order to minimize reflection losses, as explained fully in a patent to O. B. Blackwell, #1,261,096 April 2, 1918 for "testing apparatus". The impedance of the device 4 is very low compared to the impedance of the circuit comprising the elements 7 and the line under test, so that a very large fraction of the secondary current of transformer 3 flows through the resistance 4. The potential across the terminals of resistance 4 is, therefore, practically independent of the impedance of the line under test. A similar transmitting apparatus *b* is located at office B for purposes which are described hereinafter.

The terminals of line L at office B may be associated with a receiving circuit *c* by means of a switch 9, when the same is thrown to its dotted position. Circuit *c* comprises a shielded transformer 8 connected in series with a condenser 10 which is provided to keep direct current from flowing through the primary of the transformer and for neutralizing the reactance of the coil. To minimize reflection losses at the junction of line L and transformer 8, the impedance of the transformer may be adjusted to approximate the impedance of the line by means of a variable tap in the secondary circuit. A switch 11 is employed to associate the transformer either with an artificial line 12 of constant impedance, herein termed the calibrating artificial line, or with an artificial line 13, of variable transmission equivalent and constant impedance, herein termed the measuring artificial line. A switch 14 is provided to associate the other end of either of these lines with a potentiometer 15, which is connected to the high impedance input circuit of a three-stage amplifier comprising electron tubes 16, 18 and 19. A fourth electron tube 20 is provided for receiving the output current of the amplifier and causing the same to flow through a direct current ammeter 21. The minute current which flows through the measuring circuit is thus not only augmented to a readily measurable value, but converted into a unidirectional current which may be measured by a direct current instrument, this device being inherently more accurate at small values of current than any commercial meter suitable for alternating current and being more rapid in operation. By means of a high resistance 22 associated with the plate circuit of tube 19, and by omission of the C battery of the same tube, i. e., the battery which is ordinarily used to supply negative potential to the grid, the direct current output of the circuit is limited to a certain predetermined value, so that the meter 21 is protected from damage by abnormal potentials impressed on the measuring circuit. A filter 17 is employed to prevent current induced in line L from extraneous sources from reaching the ammeter, this filter being located behind the first stage of the amplifier to prevent the impedance of the filter from affecting the impedance of the receiving circuit.

In the use of the measuring apparatus of this invention the receiving circuit $c$ is first calibrated by current from the sending circuit $b$, the switches 9, 11 and 14 being placed into the positions shown in the drawing. The impedance of the artificial line in circuit $b$ and the impedance of the transformer 8 are then adjusted to correspond approximately to the impedance of the line which is subsequently to be tested. Current from the generator in the circuit $b$ then flows through the adjacent artificial line, switch 9, transformer 8, calibrating line 12 and through the amplifier, filter and rectifier into meter 21. The potential impressed on this circuit is proportional to the reading of meter 5' and the current transmitted by the circuit is proportional to the reading of meter 21. The current from the generator is regulated by resisistance 2' until the meter 5' indicates a current of a certain arbitrary value, and the potentiometer 15 is adjusted until the pointer of meter 21 stands at a predetermined position, say the middle of the scale.

The receiving apparatus having thus been calibrated, switches 9, 11 and 14 are thrown into their dotted positions, so that current from sending circuit $a$ flows over line L through the measuring line 13 and, as before, through the amplifier, filter and rectifier into meter 21. Resistance 4 is made equal to resistance 4' and resistance 2 is adjusted until the reading of meter 5 corresponds exactly to the previous reading of the meter 5', so that the voltage impressed on the circuit during the test is the same as the voltage used for the calibration. The measuring line 13, at one extreme of its adjustment, namely opposite to that shown in the drawing, has the same transmission equivalent as the calibrating line 12; consequently, with line L in series with the line 13 the current which reaches meter 21 is less than before. The equivalent of the measuring line is then reduced by adjustment of a dial 13$^a$ until the pointer of meter 21 is again in the middle of the scale. The transmission equivalent of the line under test is clearly equal to the amount by which the equivalent of the measuring line has been reduced to restore the pointer of meter 21 to the middle of the scale, this amount being indicated by dial 13$^a$, which for convenience is calibrated so as to give directly the number of miles of standard cable to which the line L is equivalent.

The calibrating artificial line may, when desired, be so constructed that its equivalent may at times be made more than or less than, the equivalent of the measuring line; so that in the first case the equipment may be used to measure lines whose transmission equivalent is greater than that of the measuring line 13, and in the other case, to measure lines which, because of repeater installations, have a negative transmission equivalent. For example, in case the calibrating line has a transmission equivalent of 60 miles and the measuring line a maximum equivalent of 40 miles, the device may be used to measure lines having a transmission equivalent as high as 60 miles, the equivalent of the line under test being found by adding 20 miles to the reading of the dial. Similarly, in case the calibrating line has an equivalent of 20 miles, the device may be used to measure lines having a transmission equivalent as low as 20 miles, the equivalent of the line under test being found by deducting 20 miles from the reading of the dial.

It should be noted that the calibrating line may be dispensed with for measuring lines whose transmission equivalents are within the range of the measuring artificial line, by calibrating the receiving circuit with dial 13$^a$ at some definite setting, and then adjusting the same for measurements. The use of the calibrating line, however, avoids the necessity of turning dial 13$^a$ frequently back and forth from calibrating to measuring positions and thus affords a considerable saving in time, when a large number of measurements is to be made.

In case the line L does not have the same impedance at both ends, the impedances of the artificial lines in sending circuits a and b are adjusted to the value of the impedance of the end of the line to which circuit a is connected, and the impedance of transformer 8 is made equal to the impedance of the other end of the line, so that the reflection loss is a minimum at each end of the line.

The generator 1 may be of any suitable type, preferably a source of variable frequency having a symmetrical voltage wave; for example, a vacuum tube oscillator, or a single frequency tone generator of the vibrating reed type, or a frequency band generator, the frequency of which varies rapidly over the entire voice range or part thereof and thus gives results which closely approximate the conditions obtaining for voice currents.

Where the line circuit to be tested is in the form of a loop, both ends of the line being at the same office, the test is made in similar manner, a sending circuit being associated with the one end of the line and a receiving circuit at the same office, with the other end thereof, as readily understood.

Although only one form and arrangement of the apparatus and circuits embodying this invention is shown and described herein it is readily understood that various changes and modifications may be made therein within the spirit and scope of the following claims without departing from the scope of this invention.

What is claimed is:

1. The method of determining the transmission equivalent of an electrical device, which consists in associating said device with an arrangement of apparatus having a known transmission equivalent, then reducing the value of the transmission equivalent of said device to restore the combination to the equivalent value of the device alone before said association, and determining the extent of the change in the value of said transmission equivalent.

2. The method of determining the transmission equivalent of an electrical device, which consists in associating said device with an arrangement of apparatus having a known transmission equivalent in such manner as to cause a change in the transmission by said device, changing the transmission efficiency of said arrangement so as to restore the transmission equivalent thereof to said known value and determining the extent of said change.

3. The method of determining the transmission equivalent of an electrical device, which consists in changing the transmission efficiency of a circuit by associating said device with said circuit, restoring the transmission efficiency of said circuit including said device to its former value by varying the transmission equivalent of said circuit, and in ascertaining the extent of the said variation.

4. The method of determining the transmission equivalent of an electrical device, which consists in adjusting the transmission efficiency of an arrangement of apparatus to a certain value, connecting said device under test in series with said arrangement and thus modifying the transmission efficiency of the two combined, restoring said efficiency to its former value by changing the transmission equivalent of part of said arrangement, and ascertaining the extent of said change.

5. The method of determining the transmission equivalent of an electrical device, which consists in connecting said device in series with an artificial line having a variable transmission equivalent, changing the equivalent of said line until the equivalent of the line and the device combined bears a definite relation to a certain value of the equivalent of said artificial line, and ascertaining the extent of the change in the equivalent of the said line.

6. The method of determining the transmission equivalent of an electrical device, which consists in connecting said device in series with an artificial line of variable transmission equivalent, changing the equivalent of said artificial line until the equivalent of the device combined with the line is equal to a certain value of the equivalent of said artificial line, and determining the extent of the change in the equivalent of the artificial line.

7. In an apparatus for determining the transmission equivalent of an electrical device, a circuit arrangement having a certain transmission efficiency, means for associating said device under test with said circuit arrangement and thus modifying the efficiency of the two combined, and means in said circuit having a variable transmission equivalent for restoring the transmission efficiency of the circuit to its former value.

8. In an apparatus for determining the transmission equivalent of an electrical device, a circuit arrangement comprising means for indicating the current input and output to said arrangement, means for associating the device under test with said arrangement and modifying the relative value of said input and output currents, and means in said arrangement having a variable transmission equivalent for restoring the ratio of said input and output currents to their former value.

9. In an apparatus for determining the transmission equivalent of an electrical device, a circuit arrangement comprising means for indicating the input current thereto and means for indicating the output current thereof, an apparatus in said circuit of certain transmission equivalent, means for adjusting the output current of said arrangement to a predetermined value relative to the input current, means for connecting said device under test in series with said circuit, and means for changing the transmission equivalent of said apparatus until the output current of said arrangement bears again said predetermined value to said input current.

10. In an apparatus for determining the transmission equivalent of an electrical device, an arrangement of circuits comprising a meter for indicating the current input to said circuits and a meter for indicating the current output of said circuits, an artificial line, means interposed between said line and said output meter for amplifying and rectifying said output current, a potentiometer interposed between said artificial line and said output meter for governing the value of said output current relative to said input current, means for connecting said device under test in series with said arrangement, means for changing the transmission equivalent of said artificial line when said device is associated with said circuit for restoring the output current to its previous value, and a device governed by said last mentioned means for indicating the extent of the change in the transmission equivalent of said artificial line.

11. In an apparatus for determining the transmission equivalent of an electrical device, the combination of a source of current, a circuit arrangement, means for associating said arrangement with said source in such manner that only a portion of the current from said source is impressed on said arrangement, an ammeter associated with said means, a device responsive to the current transmitted by said circuit arrangement, amplifying and rectifying means interposed between said circuit and said current responsive device, means for varying the value of the current impressed by said arrangement on said current responsive device, a pair of artificial lines, a device for connecting one or the other of said lines with said circuit arrangement, means for at times connecting the electrical device under test into said circuit arrangement in series with one of said artificial lines, a dial for adjusting the transmission equivalent of said one of the lines, and means associated with said dial for indicating the transmission equivalent of the line under test.

12. The method of determining the transmission equivalent of an electrical device by means of a circuit including calibrated artificial line in series therewith, which consists in adjusting the testing circuit at two points to equalize it with the impedance of said device, then interposing said device between those points and cutting out part of the calibrated artificial line in series, and noting thereby the attenuation that was produced in the circuit by interposing said device.

13. The method of determining the transmission equivalent of an electrical device by means of a circuit including calibrated artificial line in series, which consists in equalizing the impedance of said circuit to that of said device and then associating said device therewith, and noting the decrease in the transmission equivalent of the calibrated artificial line that is necessary to equalize the combination to the transmission equivalent of the said artificial line before the said device was introduced in the circuit.

14. The method of determining the transmission equivalent of an electrical device by means of a circuit including calibrated artificial line in series, which consists in applying a certain electromotive force at one point in the circuit, measuring the current at another point, equalizing the impedance between those points to the characteristic impedance of the device to be tested, interposing the device in said circuit and cutting out part of the calibrated artificial line in series, and noting thereby the attenuation produced by the interposition of said device.

15. The method of determining the transmission equivalent of an electrical device by means of a circuit including calibrated artificial line in series, which consists in first adjusting the circuit with reference to the characteristic impedance of the device, then interposing the device in said circuit and cutting out part of the calibrated artificial line in series, and thereby noting the attenuation caused by the interposition of said device.

16. The method of determining the transmission equivalent of a line, which consists in equalizing a testing circuit located at one end of the line to the characteristic impedance of the line, then energizing said testing circuit, then substituting for the source of energy an equal source with the line between and noting the attenuation produced by this change.

17. The method of determining the transmission equivalent of a line, which consists in energizing a testing circuit at one end of said line, then cutting off the energy source and substituting an equal source located at the distant end of the line with the line between and noting the attenuation produced thereby in the testing circuit.

18. In an apparatus for determining the transmission equivalent of an electrical device, a testing circuit comprising an adjustable transformer, a device to produce attenuation and a current meter on one side of the said transformer, a source of electromotive force on the other side of the transformer, means to interpose the device to be tested between said source and said transformer, and means to equalize the circuit to correspond to the impedance of said device, said means being located between the said source and the said device to be tested.

19. In an apparatus for determining the transmission equivalent of an electrical device, a calibrated artificial line, means at the input to adjust it to the characteristic impedance of the device to be tested, an amplifier at the output end of the artificial line, a wave filter connected with the output of the amplifier, and a measuring instrument connected with the output of the wave filter.

In testimony whereof I have signed my name to this specification this 3rd day of September 1919.

FRED H. BEST.